United States Patent
Benson et al.

(10) Patent No.: US 10,826,901 B2
(45) Date of Patent: Nov. 3, 2020

(54) SYSTEMS AND METHOD FOR CROSS-CHANNEL DEVICE BINDING

(71) Applicant: INAUTH, INC., Arlington, VA (US)

(72) Inventors: Glenn S. Benson, Newton, MA (US); Daniel Goldberg, San Francisco, CA (US); Chris Guenther Moos, Scottsdale, AZ (US); Paul Marsolan, Santa Monica, CA (US)

(73) Assignee: INAUTH, INC., Arlington, VA (US)

( * ) Notice: Subject to any disclaimer, the term of this patent is extended or adjusted under 35 U.S.C. 154(b) by 223 days.

(21) Appl. No.: 15/360,048

(22) Filed: Nov. 23, 2016

(65) Prior Publication Data

US 2017/0149777 A1 May 25, 2017

Related U.S. Application Data

(60) Provisional application No. 62/289,989, filed on Feb. 2, 2016, provisional application No. 62/259,921, filed on Nov. 25, 2015.

(51) Int. Cl.
*H04L 29/06* (2006.01)
*H04W 12/08* (2009.01)
(Continued)

(52) U.S. Cl.
CPC ...... *H04L 63/0876* (2013.01); *H04L 63/0815* (2013.01); *H04L 63/10* (2013.01);
(Continued)

(58) Field of Classification Search
CPC . H04L 63/0876; H04L 67/146; H04L 67/303; H04L 63/10; H04W 12/06
See application file for complete search history.

(56) References Cited

U.S. PATENT DOCUMENTS 6,041,133 A    3/2000   Califano et al.
6,185,316 B1    2/2001   Buffam
(Continued)

FOREIGN PATENT DOCUMENTS

EP    3232611    * 12/2008

OTHER PUBLICATIONS

Adaptive Authentication for Enterprise, IAPRIORART00003020, 2009.
(Continued)

*Primary Examiner* — Harunur Rashid
(74) *Attorney, Agent, or Firm* — Greenberg Traurig, LLP

(57) ABSTRACT

A system facilitates secure communication between an authorized user device and two or more servers via two or more channels that are associated with the respective servers. For each communication channel, the system receives a device identifier for the authorized user device and links the device identifiers together via another identifier, thereby allowing the system to recognize that the different device identifiers identify the same authorized user device. The system can identify an unauthorized device masquerading as the authorized user device by determining that a communication from the unauthorized device does not include another identifier linking the two or more device identifiers and/or by determining that a device identifier computed during the registration process is different from a linked identifier.

11 Claims, 5 Drawing Sheets

(51) Int. Cl.
*H04W 12/06* (2009.01)
*H04W 12/12* (2009.01)
*H04L 29/08* (2006.01)
*H04W 88/02* (2009.01)

(52) U.S. Cl.
CPC ........ *H04L 63/1441* (2013.01); *H04L 67/146* (2013.01); *H04L 67/303* (2013.01); *H04W 12/0608* (2019.01); *H04W 12/08* (2013.01); *H04W 12/1202* (2019.01); *H04L 63/18* (2013.01); *H04L 67/42* (2013.01); *H04L 2463/082* (2013.01); *H04W 88/02* (2013.01)

(56) References Cited

U.S. PATENT DOCUMENTS

| | | |
|---|---|---|
| 7,272,728 B2 | 9/2007 | Pierson et al. |
| 8,213,907 B2 | 7/2012 | Etchegoyen |
| 8,285,994 B2 | 10/2012 | Shah et al. |
| 8,312,157 B2 | 11/2012 | Bjorn Markus et al. |
| 8,316,421 B2 | 11/2012 | Etchegoyen |
| 8,590,021 B2 | 11/2013 | Steeves et al. |
| 8,817,984 B2 | 8/2014 | Miller et al. |
| 8,961,619 B2 | 2/2015 | Gum |
| 9,294,448 B2 | 3/2016 | Miller et al. |
| 9,559,852 B2 | 1/2017 | Miller et al. |
| 9,722,804 B2 | 8/2017 | Miller et al. |
| 2002/0044651 A1 | 4/2002 | Tuvell |
| 2005/0278542 A1 | 12/2005 | Pierson et al. |
| 2006/0036862 A1 | 2/2006 | Tuvell et al. |
| 2006/0041752 A1 | 2/2006 | Tuvell et al. |
| 2006/0050869 A1 | 3/2006 | Tuvell et al. |
| 2006/0282660 A1 | 12/2006 | Varghese et al. |
| 2007/0240217 A1 | 10/2007 | Tuvell et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240221 A1 | 10/2007 | Tuvell et al. |
| 2007/0240222 A1 | 10/2007 | Tuvell et al. |
| 2008/0086773 A1 | 4/2008 | Tuvell et al. |
| 2008/0086776 A1 | 4/2008 | Tuvell et al. |
| 2008/0196104 A1 | 8/2008 | Tuvell et al. |
| 2009/0025084 A1 | 1/2009 | Siourthas et al. |
| 2009/0282236 A1* | 11/2009 | Hallenstal ........... H04L 63/0428 713/151 |
| 2010/0229224 A1 | 9/2010 | Etchegoyen |
| 2010/0296653 A1 | 11/2010 | Richardson |
| 2010/0332400 A1 | 12/2010 | Etchegoyen |
| 2011/0082768 A1 | 4/2011 | Eisen |
| 2011/0093503 A1 | 4/2011 | Etchegoyen |
| 2011/0179484 A1 | 7/2011 | Tuvell et al. |
| 2012/0030771 A1 | 2/2012 | Pierson et al. |
| 2012/0042029 A1 | 2/2012 | Tuvell et al. |
| 2012/0201381 A1 | 8/2012 | Miller et al. |
| 2013/0340052 A1 | 12/2013 | Jokobsson |
| 2014/0007205 A1* | 1/2014 | Oikonomou ........... H04L 67/22 709/224 |
| 2014/0115160 A1 | 4/2014 | Tuvell et al. |
| 2015/0033027 A1 | 1/2015 | Miller et al. |
| 2015/0230089 A1* | 8/2015 | Barkan ............... H04L 63/0876 455/411 |
| 2015/0326674 A1* | 11/2015 | Kruglick ................ H04L 67/22 709/224 |
| 2015/0347753 A1 | 12/2015 | Tuvell et al. |
| 2016/0012227 A1 | 1/2016 | Tuvell et al. |
| 2016/0204948 A1 | 7/2016 | Miller et al. |
| 2016/0261416 A1 | 9/2016 | Miller et al. |
| 2016/0366145 A1* | 12/2016 | Raghavendra ........ H04L 63/102 |

OTHER PUBLICATIONS

RSA Solution Brief, RSA Adaptive Authentication, Offering Multiple Ways to Provide Strong Two-Factor Authentication to End Users, IAPRIOR ART00003043, 2008.
RSA Solution Brief, RSA Adaptive Authentication, Balancing Risk, Cost and Convenience, IAPRIORART00003024, 2008.
RSA Adaptive Authentication for Financial Services, IAPRIORART00003036, 2008-2009.
RSA Adaptive Authentication, http://web.archive.org/web20100102005728http://rsa.com/node.aspx?id=3018; IAPRIORART00003040, Jan. 2, 2010.
RSA SecurID Software Token 4.1 Administator's Guide, IAPRIORART00003047, Nov. 2009.
The RSA Authentication Decision Tree, IAPRIORART00003145, 2011.
Arcot RiskFort Fraud Detection, IAPRIORART00004119, Jan. 2, 2010.
Arcot RiskFort Fraud Detection, IAPRIORART00003337, Dec. 8, 2010.
Arcot RiskFort Fraud Dection and Prevention Data Sheet, IAPRIORART00003687, 2008.
Arcot RiskFort Administration Guide Version 2.2.6, IAPRIORART00003341, Sep. 2010.
Arcot RiskFort Installation and Deployment Guide (for Windows Platforms), IAPRIORART00003893, Sep. 2010.
Arcot RiskFort 2009 Installation and Deployment Guide (for Red Flat Enterprise Linux 4.0), IAPRIORART00003689, Mar. 2009.
Product Sheet: CA Arcot RiskFort, IAPRIORART00003331, 2010.
Data Sheet: CA Risk Authentication, IAPRIORART00003339, 2015.
How Unique is Your Web Browser, Peter Eckersley, Electronic Frontier Foundation, pde@eff.org, 2010.
Implicit Authentication Through Learning User Behavior, Elaine Shi, et al., 2010.
Implict Authentication for Mobile Devices, Markus Jakobsson et al., Aug. 2009.

* cited by examiner

SYSTEMS AND METHOD FOR CROSS-CHANNEL DEVICE BINDING

CROSS-REFERENCE TO RELATED PATENT APPLICATIONS

This application claims priority to and benefit of U.S. Provisional Patent Application No. 62/259,921 entitled "Systems and Methods for Cross-Channel Device Binding," filed on Nov. 25, 2015, and U.S. Provisional Patent Application No. 62/289,989 also entitled "Systems and Methods for Cross-Channel Device Binding," filed on Feb. 2, 2016, each of which is incorporated herein by reference in its entirety.

FIELD OF THE INVENTION

This disclosure generally relates to techniques for registration of user devices with servers and, in particular, to registration of a single user device that can communicate with different servers via different communication channels.

BACKGROUND

As the use of mobile devices such as smartphones and tablets continues to increase, and as more and more people around the world rely on such devices for their day-to-day activities, hacking of such mobile devices is becoming a growing problem. A typical user's mobile device generally includes one or more apps such as banking apps, ticket-purchasing apps, healthcare apps, etc. Many of these apps communicate via a network (e.g., the Internet) with a corresponding app server and exchange information therewith. The information that is exchanged often includes sensitive and private information such as account numbers, information about financial transactions, medical information etc. In some cases, a malicious user uses an unauthorized device that is different from an authorized user's device, but masquerading as the authorized device, and may cause an app server to share the user's private and sensitive information with the unauthorized device. Mobile users may also use mobile browsers to connect to mobile websites, where the mobile devices and web servers may exchange the user's sensitive and private information. Here again, a malicious user may use an unauthorized device that is different from an authorized user's device and may cause a web server to share the user's private and sensitive information with the unauthorized device.

SUMMARY

In various embodiments, a security system associated with a particular communication channel can generate and assign a unique identifier (ID) to a mobile device for communication via that channel. That unique ID may then be stored at a server associated with that particular channel. The server may exchange information with a mobile device via that channel only if the device ID for that channel matches with the stored ID. One example of a communication channel includes a communication link between a mobile app and a corresponding app server. An ID associated with this device can be called app-device-ID, which identifies a particular user device to an app server for communication with an app running on that device. InMobile™ from InAuth, Inc. is an example of a security system that can protect mobile applications executing on the Android™ or iOS™ operating systems. InMobile™ generates an app-device-ID called InPermID™ that may be used by an app server.

Another example of a communication channel includes a communication link between a mobile browser and a corresponding web server. An ID associated with a device can be called browser-device-ID, which identifies a particular user device to a web server for communication with a browser running on that device. InBrowser™ from InAuth, Inc. is a security system that can authenticate a user device using browser fingerprinting. InBrowser™ may collect browsing-related data in real time. InBrowser™ generates a browser-device-ID called InBrowserID™ that may be used by a web server. The channel-specific device IDs can prevent or at least reduce the risk of unauthorized access to user information, because a server associated with a channel (e.g., an app server communicating with an app, a web server communicating with a browser, etc.) may exchange information with a mobile device via that channel only if the device ID for that channel matches with a stored ID.

In some cases, a user may communicate with a service provider (e.g., a healthcare provider, a bank, a transportation service provider, etc.) or a vendor (e.g., an on-line store) via one particular channel, e.g., using an app, using the user's authorized mobile device. A security system such as InMobile™ may allocate a unique ID (e.g., InPermID™) to the authorized device for that channel and may use that ID in subsequent communications via this channel. Unbeknownst to the user, a malicious user may communicate with the same service provider via a different channel, e.g., using a web browser, using an unauthorized mobile device and masquerading as the user. A security system associated with the other channel, such as InBrowser™, may allocate another unique ID (e.g., InBrowserID™) to the unauthorized device for that channel and may use that ID in subsequent communications via this channel. Even if the user had previously used this other channel and established an ID for that channel for the authorized user device, the malicious user may cause the security system to replace such an ID with the one associated with the unauthorized device. User information in these situations may thus be vulnerable to unauthorized access.

In various embodiments, the security of mobile communications can be improved further by linking channel-specific device IDs across two or more channels. In particular, if a user communicates via one channel (e.g., using an app on a mobile device with an app server), not only is a channel-specific device ID for that channel created and stored but also one or more additional channel-specific device IDs for one or more additional channels (e.g., between a browser and a web server) are created and stored. These additional channel-specific device IDs are created and stored even if the user did not attempt communication via the other channels. The different channel-specific device IDs are linked together, which permits the different security systems associated with different channels to determine whether the same authorized user device is registered for communication via different channels, even though different IDs may be allocated to that device for communication via such different channels. If a malicious user attempts to register with a security system a new channel-specific ID that corresponds to the malicious user's unauthorized device, the security system may determine that a new device is being registered and may flag such a registration attempt for further investigation. The likelihood of unauthorized access to user, service provider, and/or vendor information can thus be reduced.

Accordingly, in one aspect, a method is provided for facilitating secure information exchange. In particular, the method can minimize the likelihood that an unauthorized or unauthentic device may be registered to communicate and exchange data with a server, such as an app server, a web server, etc. The method includes the step of: receiving at a first server a first link request that corresponds to a first communication channel and that includes a session identifier. The method also includes obtaining a first device identifier allocated to an authorized user device for identification of that device during a communication via the first communication channel. In general, a user device associated with (e.g., used by, owned by, etc.) an authorized user is the authorized user device. The authorized device may communicate via the first communication channel with the first server, or another server.

In addition, the method includes receiving at the first server from a second server a second link request that corresponds to a second communication channel and includes a second device identifier, that is also allocated to the authorized user device, for identification thereof during a communication via the second communication channel. The authorized device may communicate via the second communication channel with the second server, or another server. The method further includes determining that the second link request includes the session identifier that was included in the first link request, and linking, by the first server, the first and second device identifiers with the session identifier.

The first communication channel may include a communication channel between a mobile app installed on the authorized user device and an app server. The second communication channel may include a communication channel between a browser installed on the authorized user device and a web server. The first server may include one or more of an app server, a web server, and a first device identification server. The second server may also include one or more of a web server, an app server, and a second device identification server. In some cases, a single server may be configured as the first and second device identification servers. In some embodiments, the method further includes transmitting via a secure path the first device identifier and/or the second device identifier by the first server to the second server.

In another aspect, a computer system includes a first processor and a first memory coupled to the first processor. The first memory includes instructions which, when executed by a processing unit that includes the first processor and/or a second processor, program the processing unit, that is in electronic communication with a memory module that includes the first memory and/or a second memory, to facilitate secure information exchange, where the likelihood that an unauthorized or unauthentic device may be registered to communicate and exchange data with a server, such as an app server, a web server, etc., is minimized. To this end, the instructions program the processing unit to: receive a first link request that corresponds to a first communication channel and that includes a session identifier. The instructions also program the processing unit to obtain a first device identifier allocated to an authorized user device for identification of that device during a communication via the first communication channel.

In addition, the instructions program the processing unit to receive from a second server a second link request that corresponds to a second communication channel and includes a second device identifier, that is also allocated to the authorized user device, for identification thereof during a communication via the second communication channel. The instructions program the processing unit to determine that the second link request includes the same session identifier that was included in the first link request, and link the first and second device identifiers with the session identifier. In various embodiments, the instructions can program the processing unit to perform one or more of the method steps described above.

In another aspect, a method is provided for facilitating secure information exchange. Here again, this method can also minimize the likelihood that an unauthorized or unauthentic device may be registered to communicate and exchange data with a server, such as an app server, a web server, etc. The method includes receiving at a registration server a registration request from a user device, where the registration request corresponds to a communication channel for communication between the user device and the registration server or another server providing a service to the user of the user device. The method also includes determining that the registration request includes a session identifier, and transmitting a link request including the session identifier to another server. The method further includes, testing if a condition based on a response received from the other server is satisfied. If the condition is satisfied, the method includes registering the user device with the registration server and, otherwise, the method includes invoking an enhanced registration protocol. The enhanced registration protocol may include requesting and verifying other factors of user authentication such as a password, previously shared information about the user, a token provided to the user, etc., and/or manual review of the registration request.

In some embodiments, the condition includes determining that the response received from the other server includes a first device identifier allocated to the user device for identification thereof during a communication via another communication channel different from the communication channel to which the registration request corresponds. The transmitted link request may include a second device identifier allocated to the user device for identification thereof during a communication via the communication channel to which the registration request corresponds. In some embodiments, the response received from the other server includes a value of a second device identifier allocated to the user device for identification thereof during a communication via the communication channel to which the registration request corresponds. In these embodiments, the method further includes obtaining another value of the second device identifier, and the condition includes determining that the obtained value is same as the value received in the response. Obtaining the other value of the second device identifier may include computing the other value by the registration server or accessing it from an identification server.

Registering the user device may include linking both: (i) a first device identifier allocated to the user device for identification thereof during a communication via the other communication channel; and (ii) a second device identifier allocated to the user device for identification thereof during a communication via the communication channel, with the session identifier. The registration server may include one or more of a web server, an app server, and a first device identification server. The other server may include one or more of an app server, a web server, and a second device identification server.

In another aspect, a computer system includes a first processor and a first memory coupled to the first processor. The first memory includes instructions which, when executed by a processing unit that includes the first processor and/or a second processor, program the processing unit, that is in electronic communication with a memory module that includes the first memory and/or a second memory, to facilitate secure information exchange, where the likelihood that an unauthorized or unauthentic device may be registered to communicate and exchange data with a server, such as an app server, a web server, etc., is minimized. To this end, the instructions program the processing unit to: receive a registration request from a user device, where the registration request corresponds to a communication channel for communication between the user device and a registration server that may include the processing unit, or a server providing a service to the user of the user device. The instructions also program the processing unit to determine that the registration request includes a session identifier, and transmit a link request including the session identifier to another server. The instructions further program the processing unit to test if a condition based on a response received from the other server is satisfied. In addition, the instructions program the processing unit to register the user device with the registration server if the condition is satisfied and, otherwise, to invoke an enhanced registration protocol. In various embodiments, the instructions can program the processing unit to perform one or more of the method steps described above.

In another aspect, a method is provided for facilitating secure information exchange. The method includes the step of: generating a session identifier by a linker component installed on a user device. The session identifier is generated in response to user invocation of a first client module that is associated with a first communication channel. The method also includes communicating by the first client module the session identifier to a first server via the first communication channel. In addition, the method includes providing the session identifier to a second client module that is configured to communicate with a second server via a second communication channel and to transmit the session identifier to the second server. The method further includes invoking the second client module. The invoking step may be executed in response to user termination of the first client module. The method may also include displaying an information message by the second module.

In another aspect, a computer system includes a first processor and a first memory coupled to the first processor. The first memory includes instructions which, when executed by a processing unit that includes the first processor and/or a second processor, program the processing unit, that is included in a user device and is in electronic communication with a memory module that includes the first memory and/or a second memory, to facilitate secure information exchange, where the likelihood that an unauthorized or unauthentic device may be registered to communicate and exchange data with a server, such as an app server, a web server, etc., is minimized. To this end, the instructions program the processing unit to function as a linker component that generates a session identifier. The session identifier is generated in response to user invocation of a first client module that is associated with a first communication channel. The instruction also configure the first client module to communicate the session identifier to a first server via the first communication channel. In addition, the instructions program the processing unit to provide the session identifier to a second client module that is configured to communicate with a second server via a second communication channel and configure the second client module to transmit the session identifier to the second server. The instructions further program the processing unit to invoke the second client module. The instructions may program the processing unit to invoke the second client module in response to user termination of the first client module. In various embodiments, the instructions can program the processing unit to perform one or more of the method steps described above.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

For convenience of discussion, several embodiments of security systems and methods of providing security are described with reference to two specific channels, namely an app channel between an app running on a mobile device and an app server, and a browser channel between a browser and a web server. It should be understood that the cross-channel device binding techniques described herein are not limited to only these two channels and may be employed with different and/or additional communication channels. The discussion below refers to InMobile™ as a security system associated with the app channel and InPermID™ as the corresponding device ID, and InBrowser™ as a security system associated with the browser channel and InBrowserID™ as the corresponding device ID. It should be understood that these security systems and types of IDs are illustrative only and that other security systems and/or other kinds of device IDs may be used with the app channel and/or the browser channel.

Figure 1:
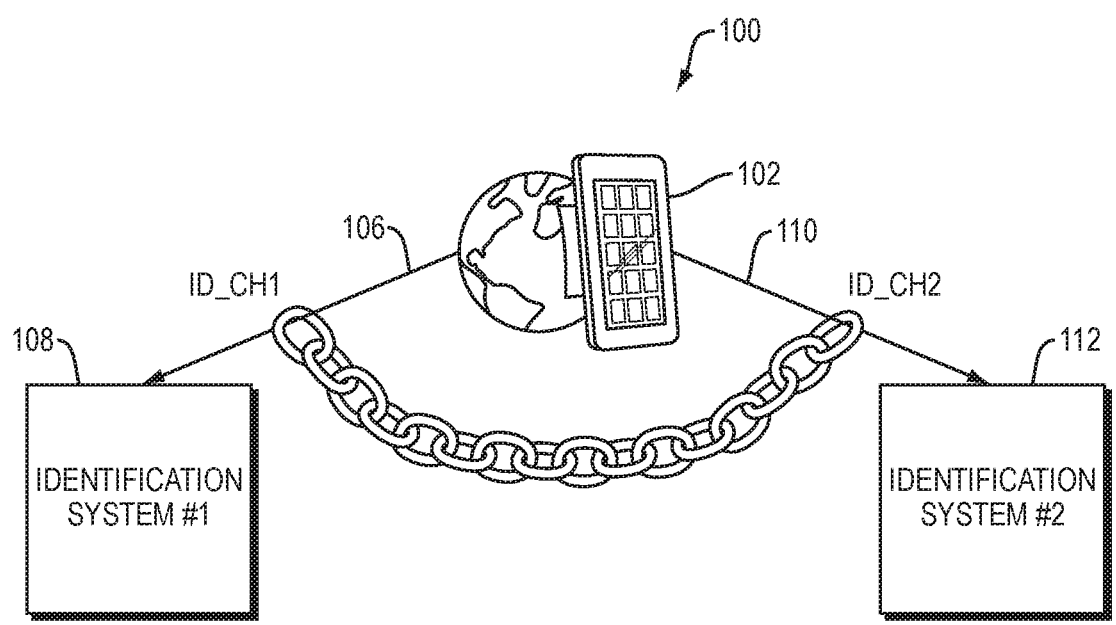
FIG. 1 schematically depicts a link between two types of device/app identifiers associated with a single user device communicating via two different communication channels with two different servers, respectively, according to some embodiments.

In some embodiments, cross-channel device binding is provided as an add-on feature to the InBrowser™ product. With reference to FIG. 1, various embodiments of a cross-channel device binding process and/or system 100 can link one device/app identifier referred to as device/app_ID_CH1 and allocated to a device/app 102 with another device/app identifier referred to as device/app_ID_CH2, also allocated to the device/app 102. The ID device/app_ID_CH1 may correspond to one particular communication channel 106 and may be provided by a device and/or software app identification system 108 designed for the channel 106. Similarly, the device/app_ID_CH2 may correspond to another different communication channel 110 and may be provided by a device and/or software app identification system 112 designed for the channel 110. In general, an identification system corresponding to a particular communication channel can allocate a unique ID to each device or software app that communicates via that particular communication channel for the first time. The identification system may also recognize a returning device/app, when any device or app attempts to communicate via the corresponding channel again, at a later time.

InMobile™ is an example of one identification system corresponding to a communication channel between a client app installed and executed on a user device and an app server. The kind of device identifiers this system generates is called the InPermID™. InBrowser™ is an example of another identification system corresponding to a communication channel between a web browser installed and executed on a user device and a web server. The kind of identifier this other system generates is called InBrowserID™. An individual may use a browser on the individual's mobile device (e.g., Chrome™, Safari™, etc.) to connect to one kind of server (e.g., a web server) protected by InBrowser™. At another time, the individual may use the same mobile device to connect to another kind of server (e.g., an app server) protected by InMobile™. The respective servers, i.e., the web server and the app server, may use the InBrowser™ and InMobile™ security systems to identify the user's device. In some cases, the two kinds of servers are owned and/or operated by the same entity. In some cases, the two kinds of servers are owned and/or operated by different entities.

Figure 2:
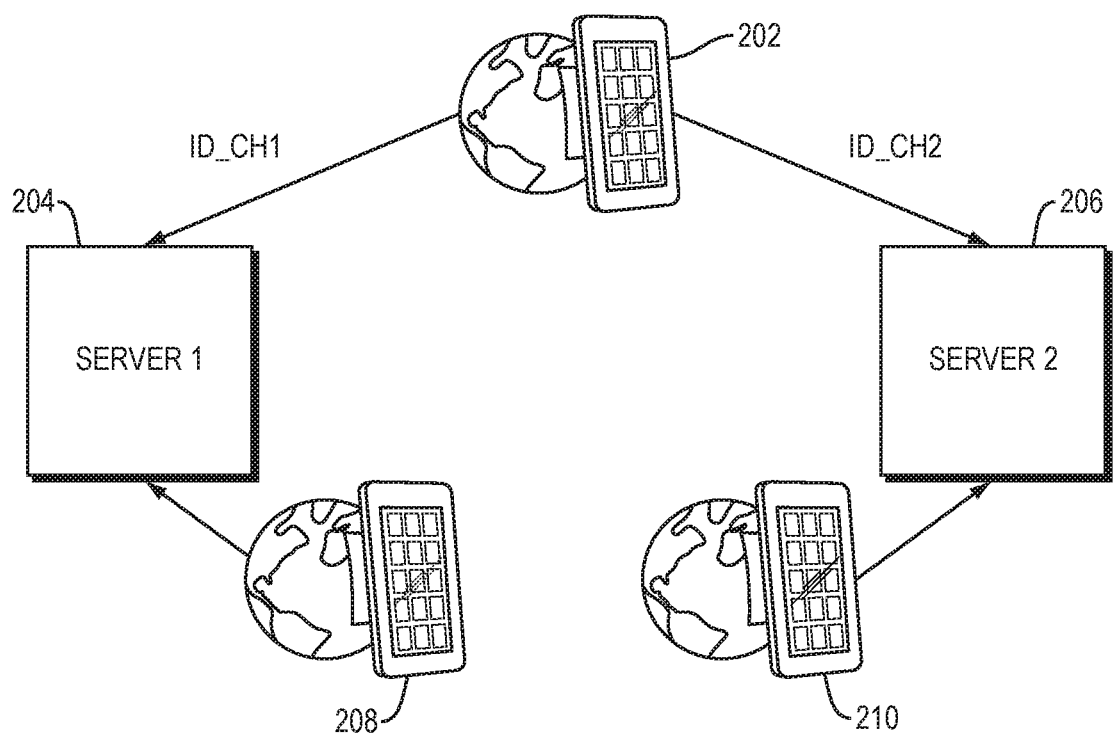
FIG. 2 schematically depicts devices communicating with two different servers, where the device/app identifiers associated with the devices are not linked.

Without cross-linking, the owners/operators of the servers typically cannot easily identify whether the two identifiers represent the same user device. For example, with reference to FIG. 2 a single device 202 connects to two different servers 204, 206 via two different device/app identification systems (e.g., InBrowser™ and InMobile™). In addition, two different devices/apps 208, 210 also connect separately to the servers 204, 206. Specifically, the device/app 208 communicates with the server 204 and the device app 210 communicates with the server 206. In various embodiments, cross-channel device binding can provide the requisite linkage to distinguish between these two scenarios.

Figure 3:
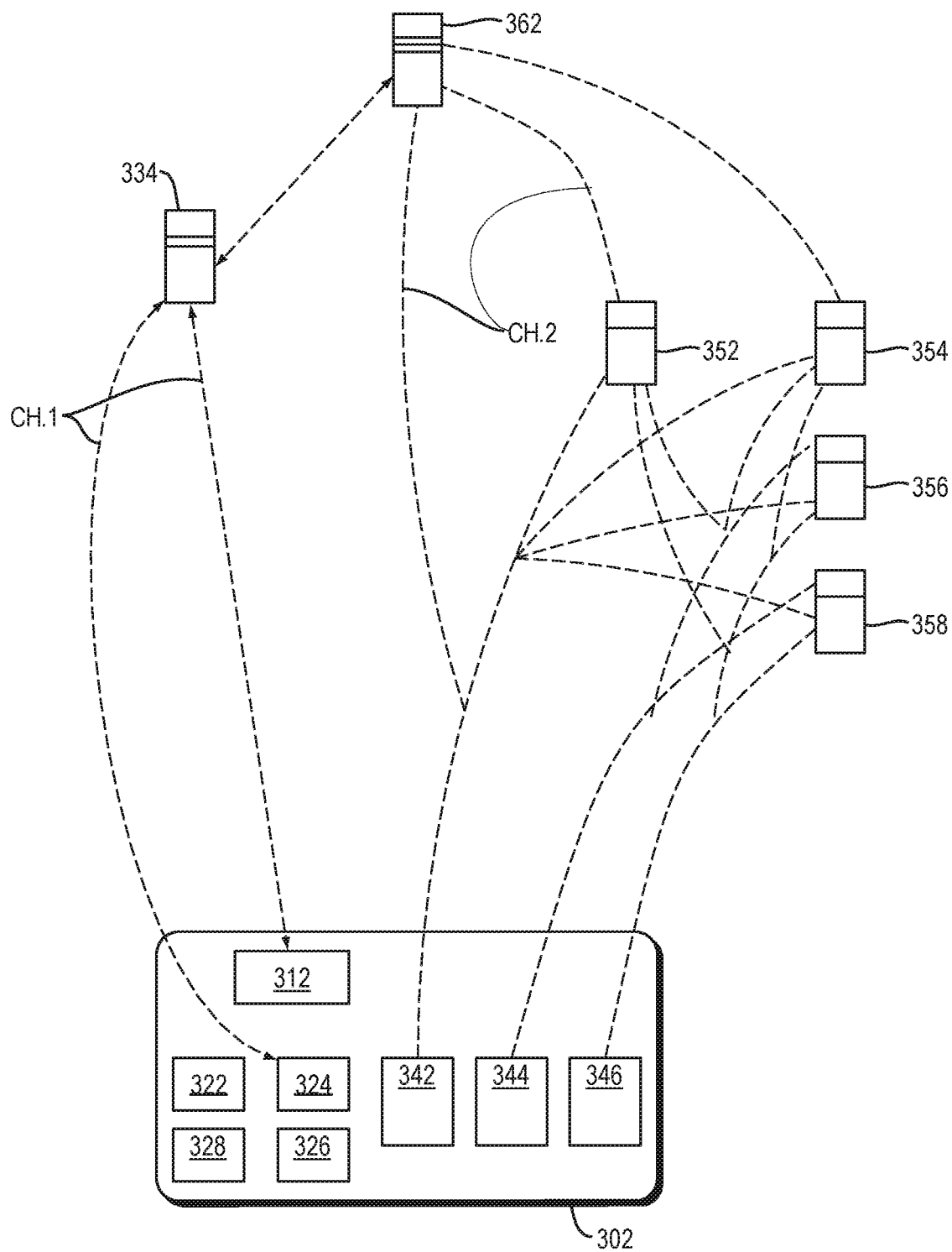
FIG. 3 schematically depicts a user device having several clients communicating with several different servers, via several different channels.

With reference to FIG. 3, some embodiments leverage a linker component 312 installed on a user device 302. In general, a user device may have installed thereon one or more client apps, such as BankingApp #1 322, BankingApp #2 324, BankingApp #3 326, HelthCareApp #1 328, etc. Less than and more than four client apps are contemplated in various embodiments. Also, client apps need not include banking and/or health-care apps, and may not be limited to such apps. Other types of apps such as e-commerce apps, music/video service apps, news apps, etc., are also contemplated.

The device/app IDs associated with one or more of these apps may be cross linked with IDs used in other communication channels. To this end, in some embodiments, a linker component links with one or more apps. In the device 302, the linker component 312 is linked with the client apps 322, 324, 328, but not with the client app 326. As such, cross channel binding may be performed using the IDs used by the client apps 322, 324, 328, but not for the ID used by client app 326.

Typically, when a user launches a particular client app, that app communicates with a corresponding app server. This communication is said to have occurred through one kind of channel; the underlying communication medium can be the Internet, a proprietary network, a cellular phone network, etc. For example, the app 324 communicates with the app server 334 via channel CH_1. Upon receiving a communication from a client app, the app server typically determines whether the communicating device and/or instance of the app is a new, previously unseen device/app instance, or a returning one. The app server relies upon a device/app identification server 362 to perform this determination. One or more app servers may be configured to perform this determination themselves. Various techniques for performing such determination accurately are described in U.S. patent application Ser. No. 15/053,362 (entitled Systems and Methods For Recognizing a Device); Ser. No. 15/297,889 (entitled Systems and Methods for Recognizing a Device and/or an Instance of an App Invoked on a Device); and Ser. No. 15/297,894 (entitled Systems and Methods for Facilitating Recognition of a Device and/or an Instance of an App Invoked on a Device), each of which is incorporated herein by reference in its entirety.

When the app 324 is launched, the linker component 312 generates a unique random, generally unguessable number called the SessionID, and transmits the SessionID to the app server 334 and/or to the device/app identification server 362. The session identifier (e.g., SessionID) can be generated randomly or pseudo-randomly. It may include alpha-numeric and/or other characters. The number of characters can be 3, 5, 8, 10, 15, or even more. In some cases, the app server is configured to forward the SessionID it receives to the device/app identification server 362. One or more of these transmissions may be performed using a secured path, which can provide protection against unauthorized access to or change or destruction of the SessionID via techniques such as tampering, replay, etc. Some systems and methods for providing a secured path are described in U.S. patent application Ser. No. 15/000,913 (entitled System and Method for Trusted Path Secure Connection over Networked Communication Systems), which is incorporated herein by reference in its entirety.

The device/app identification server 362 determines whether the device 302 and/or the instance of the client app 324 is new or returning. For a device/app instance determined to be new, the device/app identification server 362 generates a new ID. For a device/app determined to be returning, the ID that was previously allocated to the device/app is retrieved. The new or the retrieved ID corresponds to channel CH1, and is generally denoted ID_CH1. The device/app identification server 362 associates ID_CH1 (which can be a newly assigned ID or a retrieved ID) with the SessionID that was received from the linker component 312.

Typically, a user device such as the device 302 has installed thereon one or more browsers, e.g., browsers 342, 344, 346. One or more of these browsers may be used to communicate with one or more web servers 352-358, to obtain information and/or services. For example, the web server 352 may provide the same or similar services as those available via the client app 332 and its corresponding app server. Similarly, the web servers 354, 356, 358 may respectively provide the same or similar services as those available via the client apps 334, 336, 338 and their respective app servers. Some web servers may provide services that are not available through app servers and, conversely, some app servers may provide services that are not available through a web server.

The communication between a web browser and a web server is said to have occurred through a different communication channel (e.g., channel CH_2), even though, the underlying communication medium may be the same as that underlying channel CH_1, e.g., the Internet, a proprietary network, a cellular phone network, etc. Prior to providing the requested service/data to a web browser, one or more web servers may determine whether the requesting user device/browser is a new, i.e., previously unseen app/browser or a returning one. The web server 352 relies upon the device/app identification server 362 to perform this determination. One or more web servers may be configured to perform such determination themselves, and/or one or more web servers may rely upon identification server(s) other than the identification server 362.

In various embodiments, the linker component 312 launches a default browser, e.g., the browser 342. In some embodiments, the default browser is pre-selected for a user device (e.g., Safari™ for an Apple™ device, Chrome™ for an Android™-based device, etc.) In some cases, the user can choose the default browser. In some cases, the browser most frequently used is designated as the default browser. The SessionID generated by the linker component 312 is provided to the default browser 342, which the default browser transmits to the device/app identification server 362. In some cases, the default browser communicates with a web server (e.g., the web server 352) via channel CH_2, and transmits the SessionID to the web server. The web server 352 may be configured to transmit the SessionID to the device/app identification server 362.

Upon receiving a communication from the default browser 342, the device/app identification server 362 determines whether the device on which the instance of the default browser 342 was invoked is a new device or a returning one. Alternatively, or in addition, the device/app identification server 362 may determine whether the instance of the browser 342 is a new instance or a returning one. Here again, if the device/browser instance is determined to be a new one, the device/app identification server 362 generates a new device/browser ID corresponding to channel CH_2. Otherwise, the device/browser instance is determined to be a returning one, and the device/app identification server 362 retrieves a device/browser ID that was previously allocated to the device/browser and that corresponds to channel CH_2. The new or retrieved device/browser ID is generally denoted ID_CH2.

The device/app identification server 362 associates the received SessionID with ID_CH2. The SessionID thus links two device/app IDs, namely, ID_CH1 (which corresponds to a communication channel between the client app 324 and the app server 334), and ID_CH2 (which corresponds to a communication channel between the browser 342 and a web server) with the SessionID. The SessionID may be associated with a user ID, as well. In some embodiments, the device/app identification server 362 provides ID_CH2 to the web server 352. Additionally in these embodiments, the device/app identification server 362 may provide ID_CH1 linked to SessionID to the web server 352, and the web server can link the two device/app IDs, namely, ID_CH1 and ID_CH2 with the SessionID. As discussed below, the linking described herein is not limited to two channels. Other channels can include channels between other apps and their corresponding app servers and other browsers and the web servers with which the browsers can communicate, where several of the app servers and/or the web servers may be served by the same device/app identification server or by different identification servers.

Figure 4:
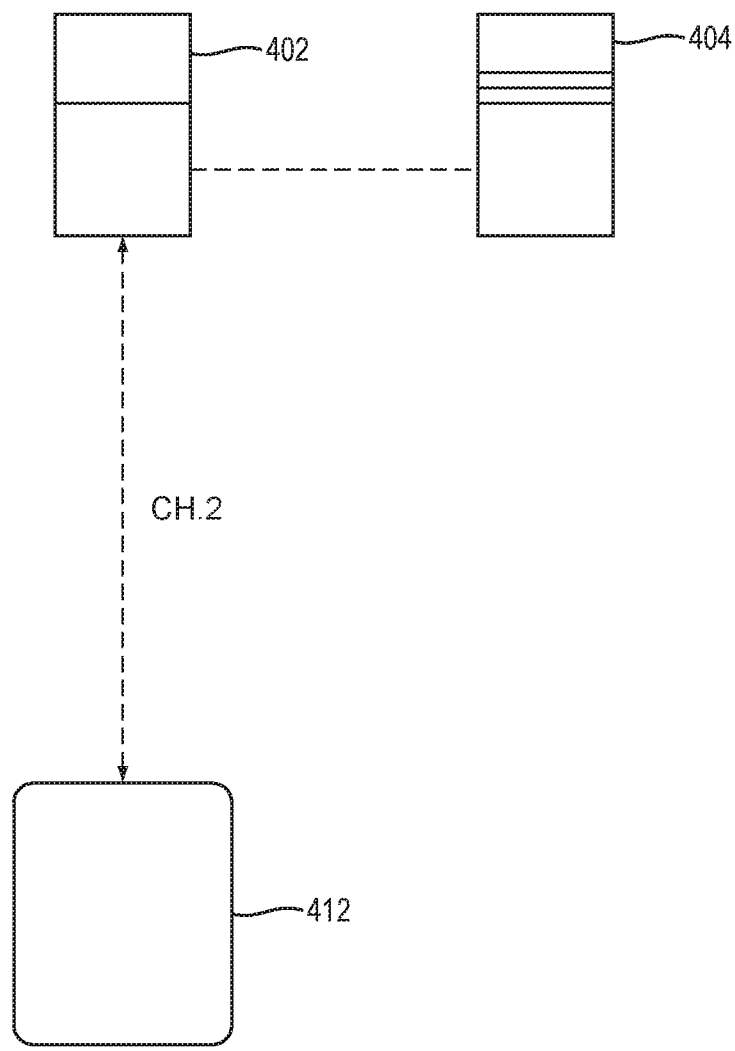
FIG. 4 schematically depicts registration attempt of an unauthorized user device.

With reference to FIG. 4, suppose a malicious user communicates with a web server 402 via one channel (e.g., channel CH_2, as shown in FIG. 4) using an unauthorized device 412 masquerading an authorized user device, and attempts to register the unauthorized device. The web server 402 and/or a device/app identification server 404 that the web server uses for device/app identification would recognize that the registration request lacks a SessionID and may suspect that a malicious user is attempting registration.

In some embodiments, the malicious user may include a phony SessionID in the request. If the format of the phony SessionID (e.g., the particular arrangement of alphabetical, numerical, and other characters, the numbers of the different kinds of characters, etc.) is not the same as that of a genuine SessionID, the server 404 can suspect that a malicious user is attempting registration. In some cases, the malicious user may be able to provide a SessionID in the format of a genuine SessionID. Upon receiving such a request, the web server 402 or the device/app identification server 404 would determine whether the unauthorized device 412 or the browser instance seeking communication is a new device/browser instance or a returning one, and would generate or retrieve an ID corresponding to the particular communication channel (i.e., CH_2 in this case). For the sake of convenience, this ID is referred to as UnAuthorized_ID_CH2.

The web server 402 or the device/app identification server 404 would also access a device/app ID corresponding to the particular communication channel (i.e., CH_2 in this case), and/or another communication channel (e.g., CH_1), using the phony SessionID. Generally, because the SessionID is phony there would be no device/app ID associated therewith for any channel and, as such, the attempt to access a device/app ID would fail. The web server 402 and/or a device/app identification server 404 may therefore suspect that a malicious user is attempting registration.

In an unlikely event, the phony SessionID may match with the SessionID allocated to some user device/app instance that was previously processed by the web server 402 and/or a device/app identification server 404. That matching user device would likely be the device of another non-targeted user, and not likely the device of the targeted user that the malicious user is trying to masquerade. The probability that the phony SessionID is the same as that linked with the targeted user's device is typically less than one in a billion, tens of billions, a trillion, etc.

For communication channel 2, an ID would be linked with the phony but matching SessionID. For the sake of convenience, this ID is referred to as OtherUser_ID_CH2. The UnAuthorized_ID_CH2 would not match with OtherUser_ID_CH2, however, and, thus, the web server 402 or the device/app identification server 404 would recognize that the device/app associated with the ID Authorized_ID_CH2 is not an authorized device. The web server 402 may then take further actions such as denying request, requesting other forms of identification, flagging the request for manual review, etc.

Figure 5:
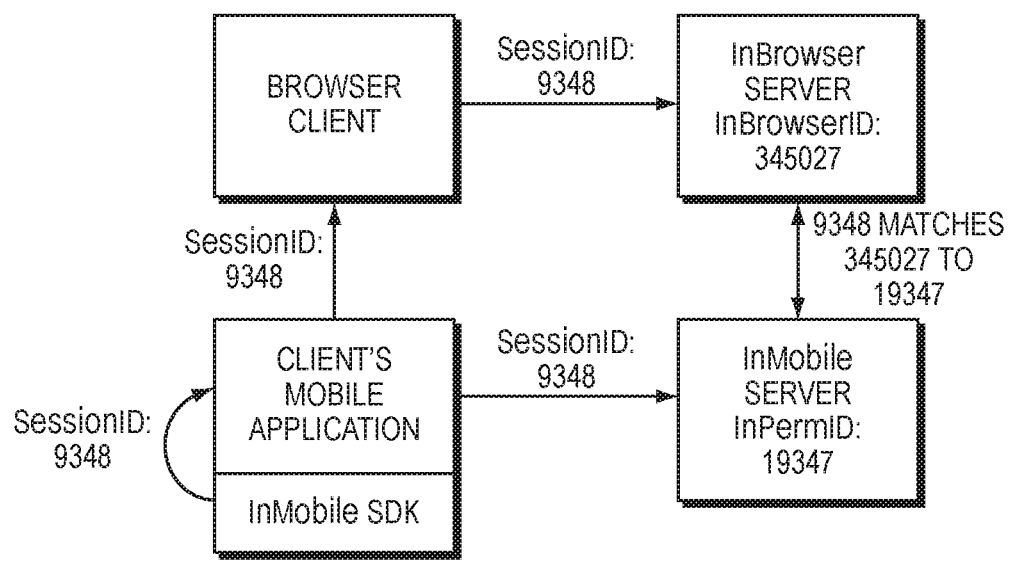
FIG. 5 schematically depicts linking of two types of device/app identifiers associated with a single user device communicating via two different communication channels with two different servers, respectively, according to some embodiments

As one example, with reference to FIG. 5, some embodiments leverage different components of the InAuth™ security system. Specifically, in these embodiments, InMobile™ software development kit (SDK) links with a client mobile application. When a user invokes or executes the client mobile application on a user device, the InMobile™ SDK generates a unique random, generally unguessable number, i.e., the SessionID (e.g., 9348), and sends the SessionID to the InMobile™ server through a secure communication link, e.g., the InMobile™ Trusted Path™. The client app communicates with an app server, and the InMobile™ server informs the app server whether the device/client app instance communicating with the web server is a new device/client app instance or a returning one. To this end, the InMobile™ server generates (for devices/client app instances determined to be new) or retrieves (for devices/client app instances determined to be returning) InPermID™, which corresponds to a communication channel between a client app and an app server.

In addition, the InMobile™ SDK automatically launches a browser (e.g., a default browser) on the same device. The launch communicates the same SessionID to the browser. The browser communicates with a web service implemented on a web server and protected by the InBrowser™ server. In other words, the InBrowser™ server may inform the web server whether the device/browser communicating with the web server is a new device/browser instance or a returning one. To this end, the InBrowser™ server generates (for devices/browser instances determined to be new) or retrieves (for devices/browser instances determined to be returning) InBrowserID™, which corresponds to a communication channel between a browser and a web server. The browser sends the SessionID in the communication to the web server, so that the InBrowser™ server learns the SessionID. The InBrowser™ server may send the InBrowserID™ to the InMobile™ server and the InMobile™ server may send the InPermID™ to the InBrowser™ server.

In various embodiments, the InBrowser™ server and the InMobile™ server associate or link the InBrowserID™ (e.g., 345027) with the InPermID™ (e.g., 19347) via the SessionID (e.g., 9348). Once linked, both the InBrowser™ server and the InMobile™ server understand that the linked InBrowserID™ and InPermID™ (e.g., 345027 and 19347), represent the same device and/or app instance. In some cases, a single server can be configured to function as the InBrowser™ server and the InMobile™ server. In various embodiments, communication of SessionID and the linking of InBrowserID™ and InPermID™ by InBrowser™ and InMobile™ is performed in a secure manner.

Typical operations at a registering user device can be described as follows: Upon launching of a client app, provide via a linker component (e.g., an SDK) a session identifier (e.g., SessionID 9348) to the client app. Send via the client app to an associated server (e.g., InMobile™ server) a link request including the session identifier (e.g., the SessionID 9348). Invoke via the linker component (e.g., the SDK) a browser app (e.g., a default browser) and provide the session identifier (e.g., the SessionID 9348) to the browser app. Transmit via the browser app another link request including the session identifier (e.g., the SessionID 9348) to another server (e.g., InBrowser™ server).

Typical operation of a server (e.g., InMobile™ Server) during registration/linking can be described as follows: Receive at a server (e.g., InMobile™ server) a first link request along with session identifier (e.g., SessionID 9348), where the first link request corresponds to first communication channel (e.g., a channel between a client app and the server). Generate a new device/app ID corresponding to the first communication channel, denoted ID_CH1, (e.g., InPermID™ 19347) or obtain the new ID_CH1 from another server (e.g., an app server). Receive a second link request from another server (e.g., InBrowser™ server) corresponding to a different communication channel (e.g., a channel between a browser app and the other server).

Determine that the second link request includes the same session identifier that was included in the first link request (i.e., SessionID 9348). Obtain from the other link request a new device/app ID corresponding to the second communication channel, denoted ID_CH2, (e.g., InBrowserID™ 345027), or generate the new ID_CH2 from device/browser attributes provided in the second link request. Associate ID_CH1 and ID_CH2 with session identifier (e.g., both InPermID™ 19347 and InBrowserID™ 345027 are linked with SessionID 9348). Optionally, send the linked ID_CH1 and/or ID_CH2 to the other server (i.e., the InBrowser™ server).

Typical operation of server associated with another communication channel can be described as follows. Receive at a server (e.g., InBrowser™ server) a link or registration request from a client (e.g., Browser Client). Test whether the received request includes a session identifier (e.g., SessionID 9348). Mark the request for further processing and/or as potentially received from an unauthorized user if the requests do not include a session identifier. Generate or obtain a device/app ID corresponding to a communication channel between the server and the client, where the ID may be denoted ID_CH_NEW (e.g., InBrowserID™ 345027).

Request from an identification server (e.g., InMobile™ server, an app server, etc.) a device/app ID corresponding to another communication channel, denoted ID_CH_PREV, where ID_CH_PREV also corresponds to the session identifier (e.g., SessionID 9348, where ID_CH_PREV can be, e.g., InPermID™ 19347). Mark the request for further processing and/or as potentially received from an unauthorized user if no ID_CH_PREV is received; otherwise link the ID_CH_NEW and ID_CH_PREV with the session identifier (e.g., both InBrowserID™ 345027 and InPermID™ 19347 are linked with SessionID 9348). Optionally, request from the identification server (i.e., the InMobile™ server) a ID_CH_NEW corresponding to the session identifier (i.e., SessionID 9348) and test whether the generated or obtained ID_CH_NEW is same as the ID_CH_NEW received from the identification server (e.g., for the communication channel between InBrowser™ server and the Browser Client and for SessionID 9348, InBrowser™ server and InMobile™ server must both provide InBrowserID™ 345027). If the two device/app IDs are different, mark the request for further processing and/or as potentially received from an unauthorized user.

In the discussion above, the user initiates registration by invoking the client app and the linker component (e.g., the SDK) invokes a browser app. In other cases, the client may invoke the browser app and then the linker component may invoke the client app. In that case, one or more of the operations performed by the InMobile™ server would be performed by the InBrowser™ server and vice versa. In yet other embodiments, two communication channels may include two different client apps communicating with two different app servers. Two communication channels can also include two browser apps communicating with two different web servers. As described with reference to FIG. 3, linking is not limited to only two types of device/app IDs corresponding to two different channels; more than two types of device/app IDs (e.g., 3, 5, 10 IDs) corresponding to different respective channels can be linked together at one or more servers.

In some implementations, the linking process can be ergonomically unpleasing. For example, when the InMobile™ SDK launches a browser on the user's device, the visible control over the device screen switches from the mobile application, which may have been invoked by the user, to the browser. As such, the browser typically moves into the device foreground activity; and the mobile application slides to a background activity. This can confuse the user because the user, who may have invoked/executed the mobile application, would unexpectedly see the mobile application replaced by the browser. The user may then need to take an explicit action such as closing the browser in order to access the mobile app.

Some embodiments improve upon the ergonomics by scheduling cross-channel device binding activity when the user logs out or closes the mobile application. In various embodiments, a SessionID is generated in the InMobile™ SDK and the InMobile™ server gets the SessionID through the Trusted Path™. These steps can be performed at any time once the user invokes a mobile app. In some embodiments, only when the user logs out or closes mobile app, the InMobile™ SDK invokes a browser using the SessionID. The browser sends an HTTP request to the server passing the SessionID as a parameter. The server may respond with an ergonomically pleasing message and the message is placed on the browser window. Since the user closed the mobile application, the user does not need to take any further action and simply views a closure window. For example, the window may thank the user for using the services of a bank, merchant, or healthcare provider. As described above with reference to FIG. 3, the InBrowser™ server would receive the SessionID and InBrowserID™. Using the SessionID the InMobile™ server and the InBrowser™ server may link together the InPermID™ and InBrwoserID™, as described above.

In various embodiments, cross-channel device binding can link two or more channel-specific device IDs, such as Device_ID_1: corresponding to App_1 communicating with App_Server_1; Device_ID_2: corresponding to App_2 communicating with App_Server_2; App_ID_3: corresponding to App_3 communicating with App_Server_3; Device_ID_4: corresponding to Browser_1 communicating with one or more web servers; Browser_ID_5: corresponding to Browser_2 communicating with one or more web servers; Device_ID_6: corresponding to Browser_3 communicating with one or more web servers; etc. Each Device_ID identifies the user device, each $App_{13}$ ID identifies an app instance, and each Browser_ID identifies a browser instance. Each of these IDs is associated with a respective communication channel. In various embodiments, two or more (and in some cases all) of these IDs are linked together via a SessionID, which may also be associated with the user registered with the device.

Due to the link, a server associated with any of the available channels can determine if a new, previously uncorrelated device is attempting communication with the server. Such a determination can avoid or at least reduce the risk of unauthorized access to user, service provider, and/or vendor information. By suspending the implementation of the cross linking until the user logs out of or shuts down a client associated with a particular communication channel (e.g., the mobile application), a visually pleasing message such as a business-supplied message can be displayed on the user device via another communication channel. For example, a message can be displayed in a browser window. This can avoid the need for the user to take an action to regain control of the client associated with the particular communication channel initially used by the user, such as the mobile application. This implementation can also reduce or avoid user confusion.

Other security systems can further enhance the security provided by InMobile™, InBrowser™, and/or cross linking described herein. These systems include the InRisk™ system that can analyze collected data and apply unique and customizable rules to identify risk(s) in real time and to improve analytics. InAuthenticate™ can securely deliver two-factor authentication messages to a registered device through the InAuth Trusted Path™. InExchange™ is a device reputation network that can enable decision capability and may stop fraudulent activity before it occurs by leveraging the experience of other users. InMarket™ system can provide enhanced device recognition for businesses, helping identify online customers that are "in market" products and services of a particular business.

Example 1

A bank provides two communication channels: an online banking website; and an on-line banking mobile application. A user signs up for both channels. Unfortunately, an unauthorized entity (a person, a business entity, a software program, etc.) attacks the online banking website. By masquerading as the user, the unauthorized entity successfully registers its own unauthorized device for web-based online banking. Unbeknownst to the user, the unauthorized entity may thus gain the ability to perform online banking operations using the entity's device. In some embodiments, InBrowser™ automatically collects information from a device attempting or performing communication with the website and identifies the unauthorized entity's device as a mobile device. Using cross-channel device binding, the bank would notice that the authorized user registered one mobile device for mobile online banking, but a different mobile device for web-based online banking. The bank can then raise a risk flag and investigate whether the different device is indeed another device used by the authorized user or an unauthorized device.

Example 2

A merchant deploys a mobile app that allows a user to view a catalog and purchase products. In order to address development efficiency goals, the merchant architects the application as a hybrid. In particular, the merchant develops portions of the application using native software technology on the user's mobile device (e.g., Android™, iOS™, or other operating systems). The merchant implements other portions of the application using a Webroot object that queries the merchant's website and populates the mobile screen with the website's contents. The merchant protects the mobile app using InMobile™ and the website application using InBrowser™. Since the mobile app is hybrid, in various embodiments cross-channel device binding links the InMobile™ InPermID™ to webroot's InBrowserID™.

If the respective device IDs corresponding to the different communication channels are not linked, the merchant would generally face an increased risk that malicious entity (e.g., a person, a business entity, a software program, etc.) would inject itself into the midst of the hybrid application. Such an entity may have unauthorized access to the user's and/or merchant's information. Alternatively or in addition, such an entity may provide information not supplied and/or authorized by the merchant to the user.

Example 3

A user has an online banking account which is accessible with a web browser. The user wishes to sign up for mobile banking. The user downloads the mobile banking application and wishes to onboard securely. In other words, the user wants to associate his or her mobile banking application with the same (or linked) account as was used for browser-based on-line banking. The user does not want another unauthorized user to link the unauthorized user's mobile banking application with the user's account. The user opens the mobile banking application, and the mobile banking application initiates the registration sequence. The result of the registration sequence is that the mobile application's InPermID is registered with a corresponding server.

The registration aspect of the mobile banking application is a hybrid app that invokes a browser (e.g., a browser on the user's device, such as the default browser or webroot). 1) When the hybrid mobile application opens the browser, the corresponding server obtains the InBrowserID. Additionally, according to some embodiments of cross-channel device binding, a SessionID is generated and used to link the InBrowserID with the InPermID, as described above. 2) Next, the user logs in to the browser-based online banking using the online banking credentials, e.g., userid/password. Once the user is logged into the browser-based online channel, the online banking server can determine that the user has a properly vetted identity. The online banking server may also determine that the user's browser is under the user's control. Using cross-channel device binding, the online banking server determines that the mobile application is also under the user's control. 3) Therefore, the server may complete the onboarding of the mobile application. The server completes this step by associating the InPermID of the mobile application with the user's ID. At this point the same userid (or linked userid) is associated with both the InBrowserID and the InPermID of the device.

The user may subsequently use the mobile application without needing to execute the registration sequence because the bank server can determine that the device is under the control of the user. In other words, the next time that the user opens the mobile banking application, the user need not enter the browser-based online banking credentials. Instead, the user may only need to enter the mobile-based credentials, even though, the browser-based credentials and the mobile-based credentials may be different.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A method comprising:
receiving, by a device/app identification server, a first session identifier from a first server, the first session identifier associated with information corresponding to a first communication channel linking a user device and the first server via a first application installed on the user device and the first server, the first session identifier generated by the user device and received by the device/app identification server from the first server via communication by the first application over the first communication channel;
generating, by the device/app identification server, a first device-communication channel identifier associated with the first communication channel and the first application, the first device-communication channel identifier identifying a pairing between the user device and the first server via the first application;
receiving, by the device/app identification server, a second session identifier from a second server, the second session identifier associated with information corresponding to a second communication channel linking the user device and the second server via a second application installed on the user device and the second server, the second session identifier generated by the user device and received by the device/app identification server from the second server via communication by the second application over the second communication channel;
generating, by the device/app identification server, a second device-communication channel identifier associated with the second communication channel and the second application, the second device-communication channel identifier identifying a pairing between the user device and the second server via the second application;
determining, by the device/app identification server, whether the first and second session identifiers correspond to the user device by determining whether the second session identifier matches the first session identifier; and
linking, by the device/app identification server, the first communication channel of the user device to the second communication channel of the user device when the first and second session identifiers match by pairing the first device-communication channel identifier with the second device-communication channel identifier.

2. The method of claim 1, wherein:
the first application comprises a mobile application installed on the user device and the first server comprises an app server; and
the second application comprises a browser installed on the user device and the second server comprises a web server.

3. The method of claim 1, wherein the first server comprises at least one of an app server, and a web server.

4. The method of claim 1, wherein the second server comprises at least one of a web server, and an app server.

5. The method of claim 1, further comprising:
transmitting via a secure path at least one of the first device-communication channel identifier and the second device-communication channel identifier by the first server to the second server.

6. A device/app identification server comprising:
a first processor; and
a non-transitory computer-readable storage medium for tangibly storing thereon program logic for execution by the processor, execution of the program logic causing a processing unit to perform steps comprising:
receiving, by the device/app identification server, a first session identifier from a first server, the first session identifier associated with information corresponding to a first communication channel linking a user device and the first server via a first application installed on the user device and the first server, the first session identifier generated by the user device and received by the device/app identification server from the first server via communication by the first application over the first communication channel;
generating, by the device/app identification server, a first device-communication channel identifier associated with the first communication channel and the first application, the first device-communication channel identifier identifying a pairing between the user device and the first server via the first application;
receiving, by the device/app identification server, a second session identifier from a second server, the second session identifier associated with information corresponding to a second communication channel linking the user device and the second server via a second application installed on the user device and the second server, the second session identifier generated by the user device and received by the device/app identification server from the second server via communication by the second application over the second communication channel;
generating, by the device/app identification server, a second device-communication channel identifier associated with the second communication channel and the second application, the second device-communication channel identifier identifying a pairing between the user device and the second server via the second application;
determining, by the device/app identification server, whether the first and second session identifiers correspond to the user device by determining whether the second session identifier matches the first session identifier; and
linking, by the device/app identification server, the first communication channel of the user device to the second communication channel of the user device when the first and second session identifiers match by pairing the first device-communication channel identifier with the second device-communication channel identifier.

7. The device/app identification server of claim 6, wherein:
   the first application comprises a mobile app installed on the user device and the first server comprises an app server; and
   the second application comprises a browser installed on the user device and the second server comprises a web server.

8. The device/app identification server of claim 6, wherein the second server comprises at least one of an app server, and a web server.

9. The device/app identification server of claim 6 wherein:
   a second server comprises the processing unit; and
   the second server comprises at least one of a web server, and an app server.

10. The device/app identification server of claim 6, wherein the instructions program the processing unit to:
    transmit via a secure path at least one of the first device-communication channel identifier and the second device-communication channel identifier by the first server to the second server.

11. A non-transitory computer-readable storage medium tangibly encoded with computer-executable instructions, that when executed by a device/app identification server, causes a method to be performed comprising:
    receiving, by the device/app identification server, a first session identifier from a first server, the first session identifier associated with information corresponding to a first communication channel linking a user device and the first server via a first application installed on the user device and the first server, the first session identifier generated by the user device and received by the device/app identification server from the first server via communication by the first application over the first communication channel;
    generating, by the device/app identification server, a first device-communication channel identifier associated with the first communication channel and the first application, the first device-communication channel identifier identifying a pairing between the user device and the first server via the first application;
    receiving, by the device/app identification server, a second session identifier from a second server, the second session identifier associated with information corresponding to a second communication channel linking the user device and the second server via a second application installed on the user device and the second server, the second session identifier generated by the user device and received by the device/app identification server from the second server via communication by the second application over the second communication channel;
    generating, by the device/app identification server, a second device-communication channel identifier associated with the second communication channel and the second application, the second device-communication channel identifier identifying a pairing between the user device and the second server via the second application;
    determining, by the device/app identification server, whether the first and second session identifiers correspond to the user device by determining whether the second session identifier matches the first session identifier; and
    linking, by the device/app identification server, the first communication channel of the user device to the second communication channel of the user device when the first and second session identifiers match by pairing the first device-communication channel identifier with the second device-communication channel identifier.

* * * * *